(12) United States Patent
Kobayashi

(10) Patent No.: US 8,456,802 B2
(45) Date of Patent: Jun. 4, 2013

(54) CONDUCTIVE ADHESIVE AND ELECTRODE FOR ELECTRIC DOUBLE LAYER CAPACITOR AND ELECTRIC DOUBLE LAYER CAPACITOR EMPLOYING IT

(75) Inventor: Kotaro Kobayashi, Tokyo (JP)

(73) Assignee: Japan Gore-Tex Inc., Tokyo (JP)

( * ) Notice: Subject to any disclaimer, the term of this patent is extended or adjusted under 35 U.S.C. 154(b) by 100 days.

(21) Appl. No.: 12/990,638

(22) PCT Filed: May 13, 2009

(86) PCT No.: PCT/JP2009/059234
§ 371 (c)(1),
(2), (4) Date: Nov. 1, 2010

(87) PCT Pub. No.: WO2009/139493
PCT Pub. Date: Nov. 19, 2009

(65) Prior Publication Data
US 2011/0043966 A1    Feb. 24, 2011

(30) Foreign Application Priority Data

May 13, 2008    (JP) ................................. 2008-126077

(51) Int. Cl.
*H01G 9/00*    (2006.01)
(52) U.S. Cl.
USPC ........... 361/502; 361/503; 361/504; 361/512; 361/523; 361/528

(58) Field of Classification Search
USPC ......... 361/502, 503–504, 509, 512, 516–519, 361/523–529; 29/25.01, 25.03
See application file for complete search history.

(56) References Cited

U.S. PATENT DOCUMENTS

| | | | | |
|---|---|---|---|---|
| 6,134,760 A | * | 10/2000 | Mushiake et al. | ........... 29/25.03 |
| 7,998,590 B2 | * | 8/2011 | Tsuru et al. | ................... 428/497 |

FOREIGN PATENT DOCUMENTS

| | | |
|---|---|---|
| EP | 0 917 166 A2 | 5/1999 |
| EP | 1 757 309 A1 | 2/2007 |
| JP | 11-154630 | 6/1999 |
| JP | 11-317333 | 11/1999 |
| JP | 2002-353074 | 12/2002 |
| JP | 2005-136401 | 5/2005 |
| JP | 2007-227666 | 9/2007 |

OTHER PUBLICATIONS

International Search Report, corresponding to PCT/JP2009/059234, dated Aug. 18, 2009, 1 sheet.
Chinese Office action issued Aug. 21, 2012 in corresponding Chinese Patent Application No. 200980117828.2 including partial English translation, 7pp.

* cited by examiner

*Primary Examiner* — Nguyen T Ha
(74) *Attorney, Agent, or Firm* — Christie, Parker & Hale, LLP

(57) ABSTRACT

A conductive adhesive with increased thermoresistant adhesion for connection between a sheet-like collector and a polarizing electrode layer serving as the structural member of an electrode for an electric double layer capacitor, and including a conductive material and a poly-N-vinylacetamide-based binder.

11 Claims, 2 Drawing Sheets

CONDUCTIVE ADHESIVE AND ELECTRODE FOR ELECTRIC DOUBLE LAYER CAPACITOR AND ELECTRIC DOUBLE LAYER CAPACITOR EMPLOYING IT

CROSS-REFERENCE TO RELATED APPLICATION(S)

This application is a National Phase Patent Application of International Application Number PCT/JP2009/059234, filed on May 13, 2009, which claims priority to and the benefit of Japanese Patent Application 2008-126077, filed May 13, 2008.

TECHNICAL FIELD

The present invention relates to a conductive adhesive used in an electrode for an electric double layer capacitor, as well as an electrode for an electric double layer capacitor and an electric double layer capacitor employing it.

BACKGROUND ART

In recent years, electric double layer capacitors capable of charge-discharge at high current have come to be considered promising as storage devices with high charge-discharge frequency, such as auxiliary power supplies for electric vehicles, auxiliary power supplies for solar cells and auxiliary power supplies for wind power generation. Consequently, electric double layer capacitors with high energy density, capable of rapid charge-discharge and exhibiting excellent durability, are in demand.

Electric double layer capacitors have a structure wherein a pair of polarizing electrode layers are situated facing each other across a separator as a positive electrode and negative electrode. Each polarizing electrode layer is impregnated with an aqueous electrolyte solution or nonaqueous electrolyte solution, and each polarizing electrode layer is connected to its respective collector. The aqueous electrolyte solution can raise the electrostatic capacity density and allows the resistance value to be lowered, but since the applied voltage must be no greater than the voltage at which water undergoes electrolysis, a nonaqueous electrolyte solution is used to increase the energy density.

Methods for producing polarizing electrodes include primarily sheet forming (rolling) methods and coating methods. Coating methods allow formation of thin electrodes by a relatively simple procedure, but pressing is carried out after coating onto a collector such as aluminum foil, and therefore the density of the electrodes cannot be increased. Sheet forming methods, on the other hand, accomplish connection with a collector such as aluminum foil after forming a sheet electrode that has been formed to a higher density than by coating methods, so that electrodes with high density can be easily obtained, and therefore such methods are most commonly used as connecting methods.

An example of an electrode for an electric double layer capacitor obtained by a sheet forming method is described in Japanese Unexamined Patent Application Publication No. 2005-136401, which proposes an electrode for an electric double layer capacitor having a polarizing porous sheet, comprising a carbonaceous electric double layer-forming material (active carbon or the like), a carbon material to ensure conductivity, and a binder-containing structural material, integrated on at least one side of a collector through a conductive interlayer, wherein the conductive interlayer comprises synthetic rubber and two or more carbon materials with different particle sizes. With this type of electrode for an electric double layer capacitor, it is possible to achieve low internal resistance, high electric capacity and high power density.

Japanese Unexamined Patent Application Publication No. 2002-353074 describes the use of a specific poly-N-vinylacetamide as a binder in an electrode paste for an electric double layer capacitor. However, Japanese Unexamined Patent Application Publication No. 2002-353074 neither mentions nor suggests the use of a poly-N-vinylacetamide-containing binder as a conductive adhesive for connection between a polarizing electrode layer and a sheet-like collector.

SUMMARY OF THE INVENTION

Conductive adhesives for connection between polarizing electrode layers and sheet-like collectors have conventionally been mixtures of polyvinyl alcohol (PVA) and conductive materials, mixtures of styrene-butadiene rubber (SBR) and conductive materials, and the like. On the other hand, a non-aqueous electrode for an electric double layer capacitor must be subjected to drying treatment before being used in a capacitor, and the conductive adhesive must exhibit thermoresistant adhesion to withstand such drying treatment.

It is therefore an object of the present invention to provide a conductive adhesive that can exhibit even higher thermoresistant adhesion while maintaining low internal resistance.

According to the invention there is provided:
(1) a conductive adhesive for connection between a sheet-like collector and a polarizing electrode layer serving as the structural member of an electrode for an electric double layer capacitor, wherein the conductive adhesive comprises a conductive material and a poly-N-vinylacetamide-based binder.

According to the invention there is also provided:
(2) a conductive adhesive according to (1), wherein the weight-average molecular weight of the poly-N-vinylacetamide is 100,000 or greater.

According to the invention there is further provided:
(3) a conductive adhesive according to (1) or (2), wherein the conductive material contains carbon black and/or graphite powder.

According to the invention there is yet further provided:
(4) a conductive adhesive according to (3) wherein the carbon black is acetylene black.

According to the invention there is yet further provided:
(5) a conductive adhesive according to (3) or (4), wherein the mean particle size of the graphite powder is no greater than 10 μm.

According to the invention there is yet further provided:
(6) a conductive adhesive according to any one of (3) to (5), wherein the graphite powder is a highly pure artificial graphite powder.

According to the invention there is yet further provided:
(7) an electrode for an electric double layer capacitor having a polarizing electrode layer connected to at least one side of a sheet-like collector through a conductive adhesive, wherein the conductive adhesive is a conductive adhesive according to any one of (1) to (6).

According to the invention there is yet further provided:
(8) an electrode for an electric double layer capacitor according to (7), wherein the sheet-like collector contains plain aluminum foil.

According to the invention there is yet further provided:
(9) an electrode for an electric double layer capacitor according to (7) or (8), wherein the polarizing electrode layer contains polytetrafluoroethylene (PTFE) as a binder.

According to the invention there is yet further provided:

(10) a method for producing an electric double layer capacitor, wherein an electrode for an electric double layer capacitor according to any one of (7) to (9) is subjected to drying treatment at a temperature of 200° C. or higher.

According to the invention there is yet further provided:

(11) an electric double layer capacitor that comprises an electrode for an electric double layer capacitor according to any one of (7) to (9).

According to the invention it is possible to obtain a conductive adhesive exhibiting higher thermoresistant adhesion than the prior art, while maintaining low internal resistance, by using poly-N-vinylacetamide as the binder in the conductive adhesive used for connection between a polarizing electrode layer and a sheet-like collector.

MODE FOR CARRYING OUT THE INVENTION

Figure 1:
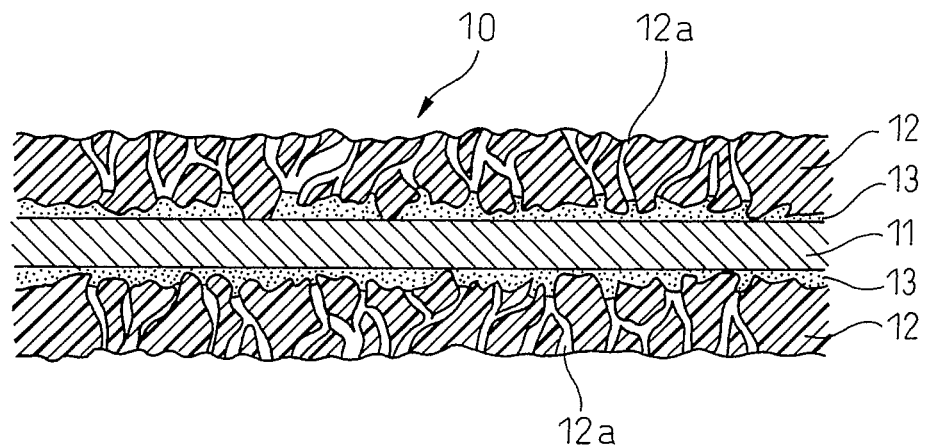
FIG. 1 is a partial magnified cross-sectional schematic drawing showing an example of an electrode for an electric double layer capacitor according to the invention.

The conductive adhesive of the invention is a conductive adhesive for connection between a sheet-like collector and the polarizing electrode layer of an electrode for an electric double layer capacitor, and it comprises a conductive material and a poly-N-vinylacetamide-based binder. The poly-N-vinylacetamide is preferably a polymer containing a repeating structural unit with an amide structure, represented by the following formula (1):

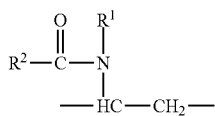

(wherein $R^1$ and $R^2$ each independently represent hydrogen or a C1-10 alkyl and preferably C1-6 alkyl group, with an ether bond, ester bond, thioether bond or amide bond optionally present in the alkyl group chain). $R^1$ and $R^2$ are preferably hydrogen, methyl, ethyl, propyl, isopropyl, butyl, 2-methylpropyl, t-butyl or methoxymethyl, and more preferably $R^1$ is hydrogen and $R^2$ is a methyl or ethyl group.

Also, the polymer containing a repeating structural unit with an amide structure is preferably a compound represented by the following formula (2):

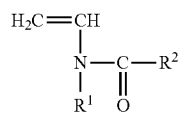

(wherein $R^1$ and $R^2$ each independently represent hydrogen or a C1-10 alkyl and preferably C1-6 alkyl group, with an ether bond, ester bond, thioether bond or amide bond optionally present in the alkyl group chain), and polymers obtained by polymerizing such compounds may be suitably used. $R^1$ and $R^2$ are preferably hydrogen, methyl, ethyl, propyl, isopropyl, butyl, 2-methylpropyl, t-butyl or methoxymethyl, and more preferably $R^1$ is hydrogen and $R^2$ is a methyl or ethyl group.

A polymer of N-vinylacetamide (a compound of formula (2) wherein $R^1$=H, $R^2$=$CH_3$) is preferably used because it can stably absorb the aqueous solution regardless of acidic or alkali pH (the hydrogen ion concentration).

According to the invention, polymers of N-vinylacetamide are N-vinylacetamide homopolymer and N-vinylacetamide copolymers. Examples of monomers that are copolymerizable with N-vinylacetamide include (meth)acrylic acid-based monomers such as (meth)acrylic acid and its salts, methyl (meth)acrylate, ethyl (meth)acrylate, (iso)propyl (meth)acrylate, butyl (meth)acrylate, octyl (meth)acrylate, 2-ethylhexyl (meth)acrylate, methoxyethyl (meth)acrylate, 2-hydroxyethyl (meth)acrylate, 2-hydroxypropyl (meth)acrylate and polyoxyalkyleneglycol mono(meth)acrylate; (meth) acrylamide-based monomers such as (meth)acrylamide, N,N-dimethyl (meth)acrylamide, N,N-diethyl (meth)acrylamide, N-methylol (meth)acrylamide, 2-(meth)acrylamide-2-methylpropanesulfonic acid and its salts, and N-isopropyl (meth)acrylamide; vinyl ester-based monomers such as vinyl acetate, vinyl butyrate and vinyl valerate; styrene-based monomers such as styrene, α-methylstyrene, p-methylstyrene, p-methoxystyrene and m-chlorostyrene; vinyl ether-based monomers such as methyl vinyl ether, butyl vinyl ether and vinyl benzyl ether; dicarboxylic acid-based monomers such as maleic anhydride, maleic acid and its salts, fumaric acid and its salts, dimethyl malate ester and diethyl fumarate ester; and allyl-based monomers such as allyl alcohol, allylphenyl ether and allyl acetate, as well as monomers such as (meta)acrylonitrile, vinyl chloride, ethylene and propylene. Two or more of the monomers mentioned above may also be copolymerized in combination.

The proportions in which these copolymerizable monomers are used are levels that do not impair the desired performance of the invention, and they are generally no greater than 60 wt %, preferably no greater than 40 wt % and even more preferably no greater than 30 wt % with respect to the total polymerizable monomer.

According to the invention, a three-dimensional crosslinked compound in which the polymer of N-vinylacetamide includes a three-dimensional crosslinked structure, is produced by first producing a crosslinked polymer of N-vinylacetamide in the presence of a crosslinking agent having two or more polymerizable double bonds in the molecule, with the aforementioned other comonomer as necessary, or a non-crosslinked precursor polymer, and reacting this with the functional groups in the polymer to form chemical bonds, and for example, it may be produced by a method of crosslinking with radiation or a peroxide.

Crosslinking agents having two or more polymerizable double bonds in the molecule, for use in the crosslinking, include various publicly known crosslinking agents such as polyallyl ethers derived from compounds with two or more hydroxyl groups in the molecule, including tetraallyloxyethane, pentaerythritol tetraallyl ether, pentaerythritol triallyl ether, trimethylolpropane triallyl ether, ethyleneglycol diallyl ether, diethyleneglycol diallyl ether, triethyleneglycol diallyl ether, diallyl ether, monosaccharides, disaccharides, polysaccharides and cellulose; polyallyl esters derived from compounds with two or more carboxyl groups in the molecule, including triallyl trimellitate, triallyl citrate, diallyl oxalate, diallyl succinate, diallyl adipate and diallyl malate; compounds with two or more allyl groups in the molecule, including diallylamine and triallyl isocyanurate; compounds with two or more vinyl ester structures in the molecule, including divinyl oxalate, divinyl malonate, divinyl succinate, divinyl glutarate, divinyl adipate, divinyl malate, divinyl fumarate and trivinyl citrate; bis(N-vinylcarboxylic acid amide) compounds, including N,N'-butylenebis(N-vinylacetamide) and N,N'-diacetyl-N,N'-divinyl-1,4-bisaminomethylcyclohexane; compounds with multiple acrylamide structures or (meth)acrylic groups, including N,N'-methylenebisacrylamide, ethyleneglycol di(meth)acrylate, diethyleneglycol di(meth)acrylate, polyethyleneglycol di(meth)acrylate, trimethylolpropane tri(meth)acrylate and pentaerythritol tri (meth)acrylate; and divinylbenzene, divinyl ether, allyl (meth)acrylate, and the like. These crosslinking agents may be used alone or in combinations of two or more.

The amount of crosslinking agent used is preferably no greater than 10 wt % and more preferably no greater than 6 wt % with respect to the total polymerizable monomer including the N-vinylacetamide.

Crosslinking agents that can produce chemical bonds by reaction with the functional groups in a non-crosslinked precursor polymer (for example, hydroxyl, amino or carboxyl groups) include polyglycidyl ether, polyisocyanurate, polyamine, polyol and polycarboxylic acid, depending on the functional groups. The amount of such crosslinking agents used is preferably in the range of 90:10-99.999:0.001 and more preferably in the range of 95:5-99.995:0.005, as the polymer:crosslinking agent weight ratio based on the total amount for a conventional crosslinked precursor polymer.

The molecular weight of the polymer of N-vinylacetamide, as the weight-average molecular weight, is preferably at least 5000, more preferably between 5000 and 10,000,000, even more preferably between 30,000 and 10,000,000, and most preferably between 100,000 and 5,000,000. If the molecular weight is too low, the thermoresistant adhesion is reduced and the mechanical strength is lowered, which is undesirable. If the molecular weight is too high, the liquid viscosity of the formed conductive adhesive becomes too high, which is undesirable.

Specific examples of polymers of N-vinylacetamide for the invention include poly-N-vinylacetamides by Showa Denko K.K., such as the crosslinked types NA-150F, NA-010F and NA-010S, the non-crosslinked types GE-191, GE-191LH, GE-191L, GE-191LL and GE-191L34, and GE-167, GE-167L, GE-163LM (sodium acrylate copolymer), XGC-330 (vinyl acetate copolymer), and XGC-265 (acrylamide copolymer).

Conductive materials to be included in the conductive adhesive for the invention include graphite which has high conductivity due to the presence of delocalized π electrons; carbon blacks which are globular aggregates having several layers of graphite carbon microcrystals collected to form a turbostratic structure (acetylene black, Ketchen black, other furnace blacks, channel black, thermal lamp black, and the like); and thermally decomposed graphite comprising a hydrocarbon such as methane, propane or acetylene thermally decomposed in a gas phase and deposited as a thin-film on a black sheet as the substrate. Artificial graphite and especially high purity artificial graphite is preferred from the viewpoint of a low metal impurity content and ensuring high conductivity, while acetylene black is preferred from the viewpoint of obtaining a relatively small particle size and relatively good conductivity. Here, "high purity" means an ash content of no greater than 0.5 wt %. The conductive material is preferably a combination of two or more with different particle sizes, in order to facilitate both low internal resistance and thermoresistant adhesion of the conductive adhesive. For example, a mixture of a highly pure artificial graphite powder and acetylene black may be suitably used.

The conductive material will now be explained for a case using acetylene black and highly pure artificial graphite. The particle size of acetylene black is usually about 10-50 nm, as the mean particle size (primary particle size). The particle size of highly pure artificial graphite used is preferably 0.5-20 μm and more preferably 1-10 μm, as the mean particle size. If the conductive interlayer obtained from the conductive adhesive has a structure comprising a conductive material having highly pure artificial graphite with this mean particle size range and acetylene black, it will be possible for a portion of the conductive interlayer to infiltrate into the pores of the polarizing electrode layer, described hereunder, while increasing the conductivity of the conductive interlayer itself, to ensure excellent bonding strength and an internal resistance-lowering effect.

The use of carbon black such as acetylene black as the conductive material with artificial graphite in this manner can be confirmed by peeling off the polarizing electrode layer or collector from the electrode to expose the conductive interlayer and, from a diffraction intensity curve for the exposed surface obtained by X-ray diffraction, observing the shape of the crystalline diffraction profile based on artificial graphite and the shape of the amorphous diffraction profile based on carbon black.

The mixing ratio of acetylene black and highly pure artificial graphite is preferably 1:10-1:1 and more preferably 1:3-1:1, in terms of weight ratio. Such a mixing ratio can ensure both sufficient adhesion and a high internal resistance-lowering effect.

The mean particle size of the highly pure artificial graphite is the value measured using a laser particle size distribution analyzer ("SALD-2000", product of Shimadzu Corp.). Acetylene black having a mean particle size within this range may be selected based on the nominal values provided by the manufacturer of the acetylene black.

These conductive materials preferably have an ash content of no greater than 0.5%, regardless of the type. When an electrode made of a carbon material with such a low ash content is applied in an electric double layer capacitor, the life of the capacitor can be lengthened.

The total amount of conductive material in the conductive adhesive is preferably between 3 wt % and 30 wt %. It is more preferably between 5 wt % and 15 wt %. If the amount of conductive material is below this range, the conductivity of the conductive interlayer may be inadequate. However, if it exceeds this range, the balance with the binder (the poly-N-vinylacetamide) used to form the conductive interlayer will be upset and the adhesion will tend to be reduced.

The amount of poly-N-vinylacetamide in the conductive adhesive is preferably no greater than 15 wt % and more preferably no greater than 10 wt %. If the amount of poly-N-vinylacetamide exceeds this range, the internal resistance may be inordinately increased. The amount of poly-N-vinylacetamide in the conductive adhesive is preferably at least 0.5 wt % and more preferably at least 2 wt %, from the viewpoint of adequately ensuring adhesion with the conductive interlayer.

The conductive adhesive of the invention may employ a construction comprising two or more conductive materials with different particle sizes, in order to include a conductive material having a small particle size (for example, a carbon black such as acetylene black) to allow satisfactory infiltration into the pores of the polarizing electrode layer, together with a conductive material having a large particle size (for example, highly pure artificial graphite). Thus, since it is possible to form a conductive interlayer with satisfactory conductivity while reducing the amount of conductive material having a small particle size, it is possible to inhibit coverage of the surfaces of the poly-N-vinylacetamide particles in the dispersing medium with the conductive material having a small particle size, and to ensure satisfactory thermoresistant adhesion when a conductive interlayer is formed.

The polarizing electrode layer, as a structural member of the electrode for an electric double layer capacitor, is a porous sheet obtained by mixing a conductive material to ensure conductivity, a binder, and the like with the electric double layer-forming material (carbon electrode material), and then roll calendering or roll extruding the ethanol- or oil-added mixture.

The electric double layer-forming material serving as the starting material for the polarizing electrode layer is not particularly restricted so long as it is a carbonaceous material that can form the electric double layer, and active carbon is a typical one. The active carbon used may be any of various types of active carbons commonly used in carbon electrodes. Specifically, charcoal, palm shell charcoal, lignite or non-carbides such as sawdust, activated with a gas such as water vapor or carbon dioxide, or activated with chemicals such as zinc chloride may be used. The form may be as a powder or particles. Since activation of the active carbon in this manner significantly increases the specific surface area, it is possible to form electrodes with high electric capacity per unit volume.

The electric double layer-forming material may be graphite-like microcrystalline carbon produced by activation of a carbon material. The microcrystalline carbon forms an electric double layer by intercalation of ions between the crystal layers upon application of a voltage, and it may be obtained by the technique described in Japanese Unexamined Patent Application Publication No. 11-317333, for example.

There are no particular restrictions on the carbon material used to ensure conductivity, and for example, the various conductive materials mentioned for the conductive adhesive may be used.

Binders to be used include ones that are publicly known in the field of electric double layer capacitors. For example, fluorine resins such as polytetrafluoroethylene (PTFE), polyvinylidene fluoride (PVDF) and ethylene-tetrafluoroethylene copolymer, and cellulose-based resins such as carboxymethylcellulose are commonly used.

The mean pore size of the polarizing electrode layer is preferably between 0.1 μm and 5 μm and more preferably between 0.5 μm and 3 μm. If the mean pore size is below this range, it may be difficult for the conductive adhesive component to infiltrate into the pores of the polarizing electrode layer, while if it exceeds this range, the conductive adhesive component will penetrate deep into the pores of the polarizing electrode layer, and the conductive interlayer remaining at the interface between the collector and polarizing electrode layer may be extremely thin to the point of lowering the bonding strength. Also, if the polarizing electrode layer is composed of active carbon, the pores of the active carbon will be covered by the conductive adhesive component, potentially resulting in reduced capacitor performance. The term "mean pore size" used throughout the present specification is the value measured using a mercury penetration porosimeter ("Pore Size 9310" by MicroMetrics, Inc.).

The porosity of the polarizing electrode layer is preferably between 40% and 90% and more preferably between 60% and 80%. If the porosity is below this range, it may not be possible to maintain a sufficient amount of electrolyte solution during use as a capacitor, and the internal resistance may be increased. In addition, since the amount of conductive adhesive component that can infiltrate into the pores of the polarizing electrode layer is reduced, it may not be possible to adequately ensure the anchor effect and internal resistance-reducing effect mentioned above. If the porosity is above this range, on the other hand, more pores will be present in which the conductive interlayer has not penetrated, when the amount of conductive adhesive is insufficient, and in such cases as well the anchor effect mentioned above may be inadequate. In addition, an air layer (in which an electrolyte solution is injected in the case of a capacitor, to serve as the liquid phase section) is present between it and the collector, and it may not be possible to adequately ensure the internal resistance-reducing effect mentioned above. Conversely, if the amount of conductive adhesive is too great, the conductive interlayer will infiltrate deep into the pores of the polarizing electrode layer. Thus, when active carbon is used in the polarizing electrode layer, most of the pores of the active carbon become covered by the component, thus lowering the specific surface area of the active carbon, and often resulting in reduced capacitor performance.

The term "porosity" (%) used throughout the present specification refers to the value determined as the ratio of the pore volume ($V_0$) with respect to the volume (V) of the entire polarizing electrode layer [($V_0$/V)×100]. The pore volume can be determined by the following formula, based on measurement of the true density (ρ) of the polarizing electrode layer and the weight (W) of the polarizing electrode layer.

$$V_0 = V - (W/\rho)$$

The porosity and mean pore size of the polarizing electrode layer can be adjusted by the type of electric double layer-forming material used as the structural material of the polarizing electrode layer, the amount of binder and the roll pressure during formation of the polarizing electrode layer. The thickness of the polarizing electrode layer will generally be 0.05-1 mm, and it is preferably 0.08-0.5 mm.

The polarizing electrode layer can be produced by the following method, for example. To the electric double layer-forming material, the carbon material used to ensure conductivity and the binder, there may be added a molding aid [water, an alcohol (methanol, ethanol, etc.), an oil petroleum or other oil) or the like] as necessary, with mixing, and the mixture may be molded into a sheet by rolling or extrusion and the molding aid removed to form a polarizing electrode layer. For example, when ethanol is used as a molding aid, the mixing ratio may be 3-15 parts by weight of the carbon material, 5-15 parts by weight of the binder and 50-300 parts by weight of the ethanol, with respect to 100 parts by weight of the electric double layer-forming material, and roll extrusion may be performed at a temperature of 50-100° C., to obtain a polarizing electrode layer having the mean pore size and porosity specified above.

The sheet-like collector, as a structural member of the electrode for an electric double layer capacitor, may be a metal material such as aluminum, titanium, tantalum, nickel, iron, stainless steel, copper or the like, but aluminum is especially preferred because of its excellent electric conductivity, its high stability (it does not dissolve or precipitate in electrolyte solutions) and its low cost. These metals may be used in the form of foils, plates or sheets. The sheet-like collector may be one having its surface subjected to roughening treatment so as to form irregularities on the surface, but the effect of the invention is more notable when the surface is a sheet-like collector such as a smooth plain aluminum foil. In this case, the void sections that may exist at the interface due to points of contact between the sheet-like collector and polarizing electrode layer are filled by the conductive interlayer, thus allowing the intervening air to be reduced, while infiltration of the conductive interlayer into the pores of the polarizing electrode layer allows the bonding strength to be improved by an anchor effect.

When the surface of the sheet-like collector is subjected to roughening treatment, the method is not particularly restricted and may be a known method such as sand blasting or etching (electrolytic etching, chemical etching or the like). Of these, chemical etching using chemical agents is preferred for easier control of the pores or irregularities formed in the sheet-like collector surface, to a shape suitable for the anchor effect of the adhesive.

The thickness of the collector (the thickness before treatment, if roughening treatment is carried out) is generally 10-100 μm and more preferably 20-50 μm.

The electrode for an electric double layer capacitor of the invention can be produced in the following manner. First, the conductive adhesive is coated onto the surfaces (bonding surfaces) of the polarizing electrode layer and/or sheet-like collector. The coated side may be the bonding surface of either the polarizing electrode layer or sheet-like collector, or coating may also be carried out on both sides. The coating amount of the conductive adhesive is the amount after drying (that is, the amount of conductive adhesive component), and it is preferably 2-15 g/m$^2$ and more preferably 2-10 g/m$^2$.

Next, the polarizing electrode layer and sheet-like collector are laminated with the coated conductive adhesive situated between them. The lamination method may involve simple stacking and attachment, but preferably pressure is applied for compression after attachment. The latter case can better ensure bonding, while also allowing more reliable penetration of the conductive adhesive into the pores of the polarizing electrode layer. Furthermore, since the polarizing electrode layer is subjected to compression and high densification, the polarizing electrode layer can be given higher capacity. The pressing method is not particularly restricted, and a relatively simple method is passing it through a pair of rolls, for example. The clearance between the rolls, with respect to the total thickness of the laminated body, is preferably 30-90% and more preferably 50-70%, for example. Such a clearance will allow high capacity to be achieved for the polarizing electrode layer. If the clearance is below this range, the collector may undergo deformation, or peeling of the polarizing electrode layer may occur.

The volatilizing components (dispersing medium, etc.) in the conductive adhesive are then removed. The removal method is not particularly restricted, and hot air drying, for example, is suitable. The hot air temperature is preferably near the boiling point of the dispersing medium. Removal of the dispersing medium forms a conductive interlayer from the conductive adhesive, to obtain an electrode for an electric double layer capacitor of the invention as shown in FIG. 1. In FIG. 1, an electrode 10 has a polarizing electrode layer 12, comprising a structural material that includes a carbonaceous electric double layer-forming material, a carbon material to ensure conductivity, and a binder, which is bonded onto both sides of a collector 11, via a conductive interlayer 13. As shown in FIG. 1, the polarizing electrode layer 12 composed of the structural material is a porous body, and part of the conductive interlayer 13 has penetrated into the pores 12a.

Figure 2:
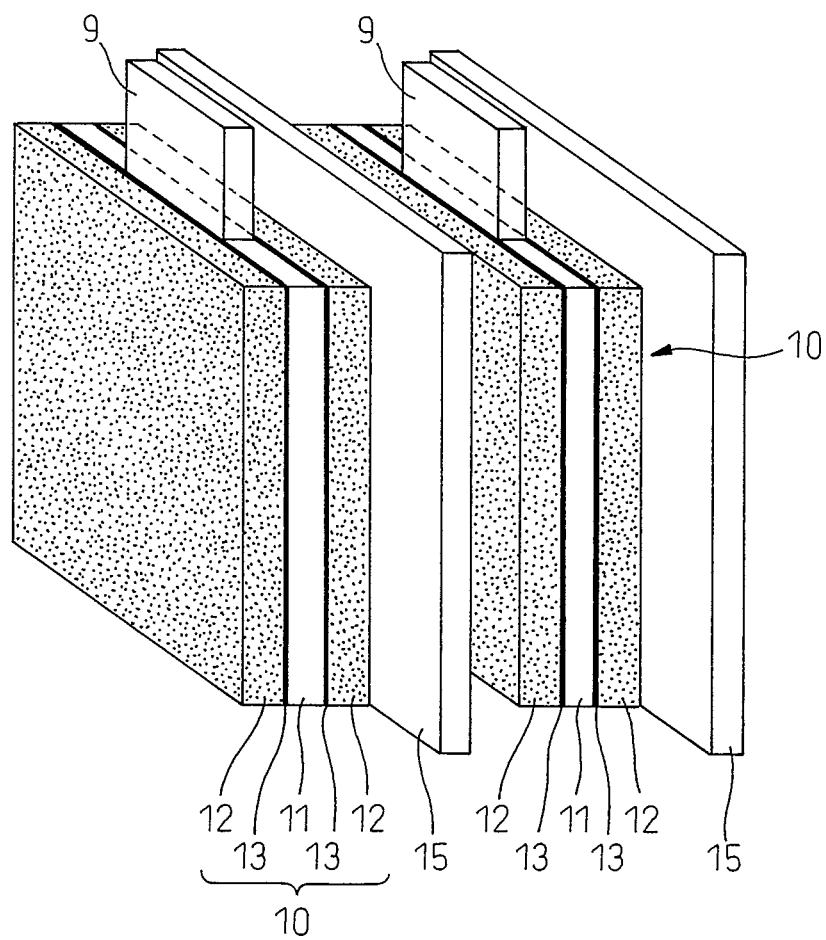
FIG. 2 is a schematic perspective view showing the combined structure of an electrode for an electric double layer capacitor according to the invention with a separator.
Figure 3:
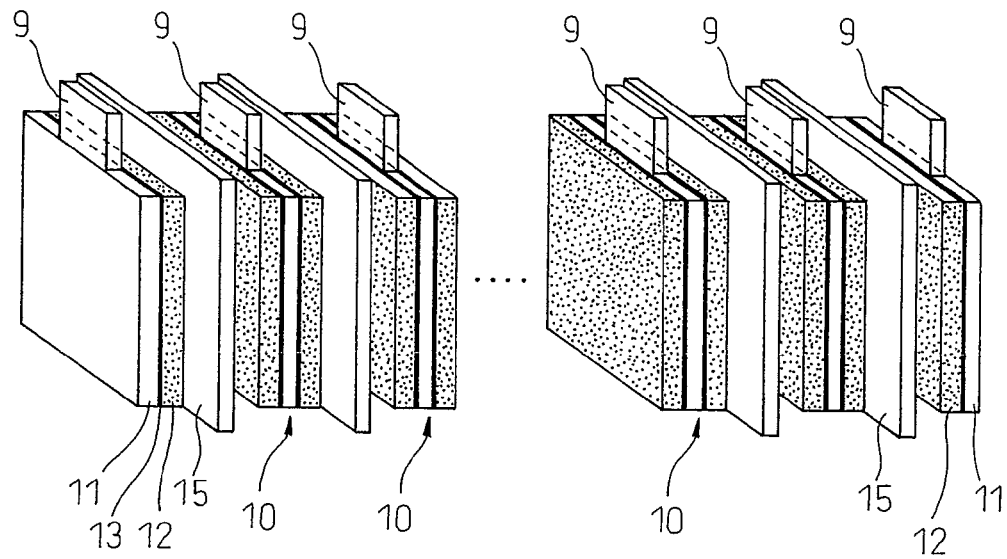
FIG. 3 is a schematic perspective view showing a series of structural elements in an electric double layer capacitor.
Figure 4:
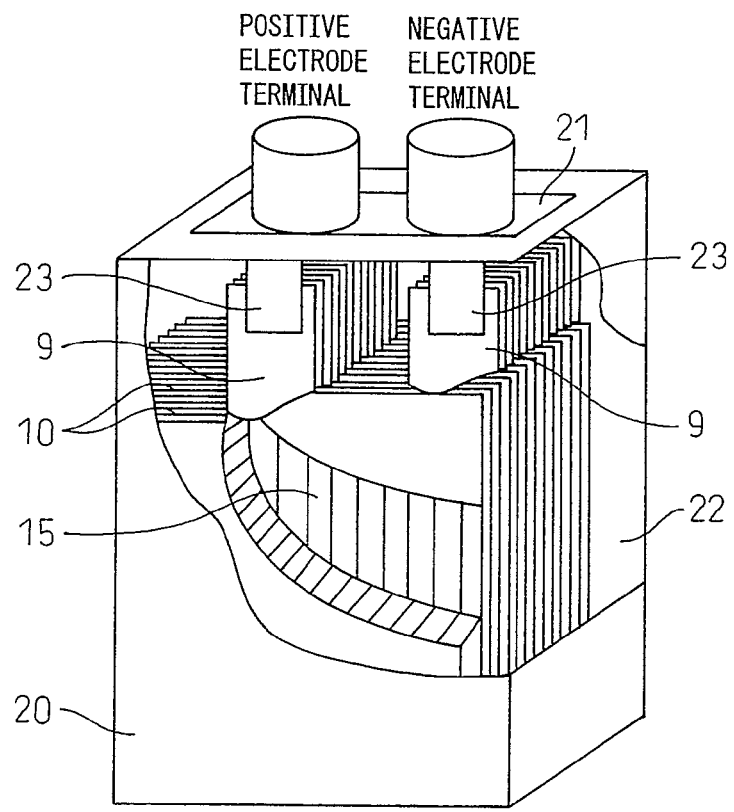
FIG. 4 is a partial broken schematic perspective view showing the construction of an electric double layer capacitor prepared in an example (invention example).

The electric double layer capacitor of the invention is obtained using the electrode for an electric double layer capacitor of the invention described above. A nonaqueous electrode for an electric double layer capacitor must be subjected to drying treatment in order to remove the moisture from the electrode before use in a capacitor. As shown in FIG. 2, for example, electrodes 10 of the invention and separators 15 may stacked in an alternating manner, and as shown in FIG. 3, such combinations may be situated in series and subjected to drying treatment. The drying temperature may be 200° C. or higher and preferably 250° C. or higher, for increased productivity of the electric double layer capacitor. In order to promote drying of the electrodes, the drying treatment is preferably carried out under reduced pressure, such as by vacuum drying. After the drying treatment, as shown in FIG. 4, the combination of the electrodes and separators is housed in a case (metal case or the like) 20 that is provided with a top covering 21 and collector leads 23, and the electrolyte solution 22 is filled between the electrodes 10 and separators 15 to obtain an electric double layer capacitor.

The separators may be ones that are conventionally known for use in electric double layer capacitors. Examples include hydrophilicized porous sheets such as PTFE, polyethylene or polypropylene, and porous sheets obtained from sisal.

The electrolyte solution may also be one that is conventionally known for use in electric double layer capacitors. Solvents for the electrolyte solution include carbonic acid esters such as propylene carbonate and butylene carbonate; lactones such as β-butyrolactone and γ-butyrolactone; sulfolanes; amide-based solvents such as dimethylformamide; nitromethane; 1,2-dimethoxyethane; acetonitriles; and the like. Examples of electrolytes for the electrolyte solution include acids, for example, fluorine-containing acids such as boric tetrafluoride, phosphoric hexafluoride, arsenic hexafluoride, antimonic hexafluoride and trifluoroalkylsulfonic acid; and chlorine-containing acids such as perchloric acid and aluminic tetrachloride; as well as alkali metal salts (sodium salts, potassium salts and the like), alkaline earth metal salts (magnesium salts, calcium salts and the like), ammonium salts, tetraalkylammonium salts (tetramethylammonium salts, tetraethylammonium salts and the like) and tetraalkylphosphonium salts (tetramethylphosphonium salts, tetraethylphosphonium salts and the like) of these acids.

In FIG. 2, 9 represents collector terminals attached to the collectors, and collector leads (not shown) are attached to the collector terminals 9. Of the plurality of arranged electrodes, those at the ends may be electrodes comprising polarizing electrode layers laminated on only one side of the collector, as shown in FIG. 3.

According to the electric double layer capacitor of the invention, it is possible to obtain low internal resistance, high electric capacity and high power density, because it employs an electrode for an electric double layer capacitor of the invention, which has lower internal resistance than the prior art.

EXAMPLES

The present invention will now be explained in greater detail by examples. However, the following examples do not restrict the invention in any way, and various modifications are encompassed within the technical scope of the invention, so long as the gist described above and below is maintained.

Example 1

[Polarizing Electrode Layer]

To a mixture comprising 85 parts by weight of active carbon powder ("YP-17" by Kuraray Chemical Co., Ltd., specific surface area: 1500 m²/g, mean particle size: 8 μm), 7 parts by weight of Ketchen black ("EC600 JD" by Ketchen Black International) and 8 parts by weight of PTFE powder, there was added 100 parts by weight of ethanol and the mixture was kneaded and subjected to roll calendering, to obtain a long polarizing electrode layer with a width of 100 mm, a thickness of 0.15 mm, a porosity of 65% and a mean pore size of 0.8 μm.

[Collector]

As the collector there was used a plain aluminum foil ("A1N30H-H18" by Nippon Foil Mfg. Co., Ltd.) having a width of 150 mm and a thickness of 30 μm.

[Conductive Adhesive]

The conductive materials used were highly pure artificial graphite ("SP-270" by Nippon Graphite Industries, Ltd.) with a mean particle size of 8 μm, and acetylene black (DENKA BLACK by Denki Kagaku Kogyo Co., Ltd.) with a mean particle size (primary particle size) of 35 nm. The binder used was poly-N-vinylacetamide ("PNVA GE191-203" by Showa Denko K.K.). These were mixed in the composition listed in Table 1 to obtain a conductive adhesive.

[Production of Electrodes]

The conductive adhesive was coated onto both sides of the collector using a coating roll. The coating amount was 12 g/m² on each side (approximately 2 g/m² after drying). After coating, a long polarizing electrode layer was layered on the conductive adhesive-coated sides (both sides) of the collector, and passed through a compression roll (clearance: 70%) to obtain a laminated sheet. The laminated sheet was passed through a continuous hot air drier set to a temperature of 150° C., for 3 minutes, and the dispersing medium was removed from the conductive adhesive to obtain a long electrode.

[Production of Electric Double Layer Capacitor]

A plurality of electrodes were punched out from the long electrode, with 10 cm square electrode bonded sections, and 2 cm×10 cm collector sections. The electrodes and separators were then combined as shown in FIG. 2 into 15 pairs. The separators used were separators obtained by hydrophilicizing treatment of porous expanded PTFE films ("BSP0102560-2" by Japan Goretex Co., Ltd., thickness: 25 porosity: 60%). The electrode groups were vacuum dried at 250° C. for 72 hours for the examples and Comparative Example 3, dried at 200° C. for 72 hours for Comparative Example 1 and dried at 150° C. for 72 hours for Comparative Example 2, and then housed in an aluminum case, collector leads were connected to each collector terminal, and a positive electrode terminal and negative electrode terminal were connected to the collector leads. Next, a propylene carbonate solution of tetraethylammonium tetrafluoroborate (concentrate: 1 mol/L) was injected into the case as an electrolyte solution, and the top covering was attached to seal the case, to obtain a rectilinear electric double layer capacitor.

The electrodes and electric double layer capacitors were evaluated in the following manner. The results are shown in Table 2 and Table 3.

<Tape Peel Test (Heat Resistance Test)>

After drying the electrode at a prescribed temperature for 24 hours, the polarizing electrode layer section was cut into a grid (5×5 mm grid squares, 144 squares), adhesive tape (DANPURON ACE II, product of Nitto Denko Corp.) was attached to the grid-formed surface, and after pressing with a finger sufficiently to remove the air bubbles between the polarizing electrode layer and adhesive tape, the tape was peeled off and the peeled condition of the polarizing electrode layer section was observed.

<Electrostatic Capacity Density>

The electric double layer capacitor was subjected to 10 continuous cycles, with 1 cycle consisting of a procedure of charging for 1500 seconds under conditions of 10 mA/cm², 2.7 V and discharging to 0 V under conditions of 10 mA/cm², and the discharge curve from the start of discharge at the 10th cycle to 0 V was integrated to determine the electrostatic capacity of the electric double layer capacitor during the 10th cycle of charging, the value of which was divided by the electrode volume to calculate the electrostatic capacity density.

<Direct Current Internal Resistance>

The formula "V=IR" was used for calculation from the electrostatic capacity density measurement.

<High-Temperature Durability Test>

The electric double layer capacitor was subjected to a repeated procedure where 1 cycle consisted of charging for 100 hours under conditions of 10 mA/cm², 2.7 V and discharging to 0 V under conditions of 10 mA/cm², at a temperature of 70° C. The electrostatic capacity of the cycle at 1000 hours in the 1st cycle was determined by the method described above for the electrostatic capacity density, and the results were evaluated as the maintenance factor of the electrostatic capacity at 1000 hours with respect to the same at the start of measurement (1st cycle) [100×(electrostatic capacity of cycle at 1000 hours)/(electrostatic capacity at 1st cycle)] (%).

Example 2

An electrode and electric double layer capacitor were fabricated and evaluated in the same manner as Example 1, except that the construction of the conductive adhesive was changed as shown in Table 1. The results are shown in Table 2 and Table 3.

Example 3

An electrode and electric double layer capacitor were fabricated and evaluated in the same manner as Example 1, except that the construction of the conductive adhesive was changed as shown in Table 1. The results are shown in Table 2 and Table 3.

Example 4

An electrode and electric double layer capacitor were fabricated and evaluated in the same manner as Example 1, except that the construction of the conductive adhesive was changed as shown in Table 1. The results are shown in Table 2 and Table 3.

Example 5

An electrode and electric double layer capacitor were fabricated and evaluated in the same manner as Example 1, except that the construction of the conductive adhesive was changed as shown in Table 1. The results are shown in Table 2 and Table 3.

Example 6

An electrode and electric double layer capacitor were fabricated and evaluated in the same manner as Example 1, except that the construction of the conductive adhesive was changed as shown in Table 1. The results are shown in Table 2 and Table 3.

Example 7

An electrode and electric double layer capacitor were fabricated and evaluated in the same manner as Example 1, except that the construction of the conductive adhesive was changed as shown in Table 1. The results are shown in Table 2 and Table 3.

Example 8

An electrode and electric double layer capacitor were fabricated and evaluated in the same manner as Example 1, except that the construction of the conductive adhesive was changed as shown in Table 1. The results are shown in Table 2 and Table 3.

Example 9

An electrode and electric double layer capacitor were fabricated and evaluated in the same manner as Example 1, except that the construction of the conductive adhesive was changed as shown in Table 1. The results are shown in Table 2 and Table 3.

Example 10

An electrode and electric double layer capacitor were fabricated and evaluated in the same manner as Example 1, except that the construction of the conductive adhesive was changed as shown in Table 1. The results are shown in Table 2 and Table 3.

Example 11

An electrode and electric double layer capacitor were fabricated and evaluated in the same manner as Example 1, except that the construction of the conductive adhesive was changed as shown in Table 1. The results are shown in Table 2 and Table 3.

Example 12

An electrode and electric double layer capacitor were fabricated and evaluated in the same manner as Example 1, except that the construction of the conductive adhesive was changed as shown in Table 1. The results are shown in Table 2 and Table 3.

Example 13

An electrode and electric double layer capacitor were fabricated and evaluated in the same manner as Example 1, except that the construction of the conductive adhesive was changed as shown in Table 1. The results are shown in Table 2 and Table 3.

Example 14

An electrode and electric double layer capacitor were fabricated and evaluated in the same manner as Example 1, except that the construction of the conductive adhesive was changed as shown in Table 1. The results are shown in Table 2 and Table 3.

Comparative Example 1

An electrode and electric double layer capacitor were fabricated and evaluated in the same manner as Example 1, except that synthetic rubber (SBR) was used instead of PNVA for the conductive adhesive, and highly pure artificial graphite with a mean particle size of 4 μm was used for the conductive material. The synthetic rubber (SBR) content and highly pure artificial graphite content were 3 wt % and 20 wt % (available products), respectively, with respect to the total amount of conductive adhesive. The results are shown in Table 2 and Table 3.

Comparative Example 2

An electrode and electric double layer capacitor were fabricated and evaluated in the same manner as Example 1, except that carboxymethylcellulose ("CMC DAICEL", product of Daicel Chemical Industries, Ltd.) was used instead of PNVA for the conductive adhesive. The results are shown in Table 2 and Table 3.

Comparative Example 3

An electrode and electric double layer capacitor were fabricated and evaluated in the same manner as Example 1, except that thermosetting polyimide ("U-VARNISH", product of Ube Industries, Ltd.) was used instead of PNVA for the conductive adhesive. The results are shown in Table 2 and Table 3.

TABLE 1

| | PNVA | | Carbon material | | | | | | |
| | | | Graphite powder | | | Carbon black | | | |
| | Average molecular weight [×10$^4$] | PNVA content [wt %] | Type | Particle size [μm] | Content with respect to total carbon material [wt %] | Type | Content with respect to total carbon material [wt %] | Carbon material content [wt %] | Total solid content [wt %] |
|---|---|---|---|---|---|---|---|---|---|
| Example 1 | 25 | 9 | SP-270 | 8 | 75 | AB | 25 | 9 | 18 |
| Example 2 | 3 | 9 | SP-270 | 8 | 75 | AB | 25 | 9 | 18 |
| Example 3 | 75 | 9 | SP-270 | 8 | 75 | AB | 25 | 9 | 18 |
| Example 4 | 150 | 9 | SP-270 | 8 | 75 | AB | 25 | 9 | 18 |
| Example 5 | 25 | 9 | SP-270 | 8 | 75 | KB | 25 | 9 | 18 |
| Example 6 | 25 | 9 | SP-270 | 8 | 75 | XC72 | 25 | 9 | 18 |
| Example 7 | 25 | 9 | CSP | 12 | 75 | AB | 25 | 9 | 18 |
| Example 8 | 25 | 9 | J-CPB | 5 | 75 | AB | 25 | 9 | 18 |
| Example 9 | 25 | 9 | CSP-E | 8 | 75 | AB | 25 | 9 | 18 |
| Example 10 | 25 | 9 | GR-15 | 8 | 75 | AB | 25 | 9 | 18 |

TABLE 1-continued

| | PNVA | | Carbon material | | | | | |
| | | | Graphite powder | | | Carbon black | | | |
| | Average molecular weight [×10$^4$] | PNVA content [wt %] | Type | Particle size [μm] | Content with respect to total carbon material [wt %] | Type | Content with respect to total carbon material [wt %] | Carbon material content [wt %] | Total solid content [wt %] |
|---|---|---|---|---|---|---|---|---|---|
| Example 11 | 25 | 9 | SP-270 | 8 | 50 | AB | 50 | 9 | 18 |
| Example 12 | 25 | 9 | SP-270 | 8 | 25 | AB | 75 | 9 | 18 |
| Example 13 | 25 | 6 | SP-270 | 8 | 75 | AB | 25 | 12 | 18 |
| Example 14 | 25 | 6 | SP-270 | 8 | 75 | AB | 25 | 6 | 12 |

*AB: DENKA BLACK by Denki Kagaku Kogyo, Co., Ltd., XC72: Vulcan XC72 by Cabot

TABLE 2

| | Tape peeling test - Drying temperature [° C.] | | | |
| | 150 | 200 | 250 | 300 |
|---|---|---|---|---|
| Example 1 | No peeling | No peeling | No peeling | No peeling |
| Example 2 | No peeling | No peeling | No peeling | Partial peeling |
| Example 3 | No peeling | No peeling | No peeling | No peeling |
| Example 4 | No peeling | No peeling | No peeling | No peeling |
| Example 5 | No peeling | No peeling | No peeling | No peeling |
| Example 6 | No peeling | No peeling | No peeling | No peeling |
| Example 7 | No peeling | No peeling | No peeling | No peeling |
| Example 8 | No peeling | No peeling | No peeling | No peeling |
| Example 9 | No peeling | No peeling | No peeling | No peeling |
| Example 10 | No peeling | No peeling | No peeling | No peeling |
| Example 11 | No peeling | No peeling | No peeling | No peeling |
| Example 12 | No peeling | No peeling | No peeling | No peeling |
| Example 13 | No peeling | No peeling | No peeling | No peeling |
| Example 14 | No peeling | No peeling | No peeling | No peeling |
| Comp. Ex. 1 | No peeling | No peeling | Total peeling | Total peeling |
| Comp. Ex. 2 | No peeling | Total peeling | Total peeling | Total peeling |
| Comp. Ex. 3 | No peeling | No peeling | No peeling | No peeling |

TABLE 3

| | Drying temperature [° C.] | Electrostatic capacity density [F/cm$^3$] | Internal resistance [ohm] | Capacity maintenance with high-temperature durability [%] |
|---|---|---|---|---|
| Example 1 | 250 | 17.0 | 0.9 | 94 |
| Example 2 | 250 | 17.0 | 0.9 | 93 |
| Example 3 | 250 | 17.0 | 0.9 | 94 |
| Example 4 | 250 | 17.0 | 0.9 | 94 |
| Example 5 | 250 | 16.8 | 1.2 | 94 |
| Example 6 | 250 | 17.0 | 1.0 | 94 |
| Example 7 | 250 | 16.7 | 1.1 | 94 |
| Example 8 | 250 | 17.0 | 1.0 | 94 |
| Example 9 | 250 | 17.0 | 1.1 | 94 |
| Example 10 | 250 | 17.0 | 1.0 | 94 |
| Example 11 | 250 | 17.0 | 0.8 | 94 |
| Example 12 | 250 | 17.0 | 1.2 | 94 |
| Example 13 | 250 | 17.0 | 1.0 | 94 |
| Example 14 | 250 | 17.0 | 0.9 | 94 |
| Comp. Ex. 1 | 200 | 17.0 | 1.0 | 88 |
| Comp. Ex. 2 | 150 | 16.5 | 1.1 | 78 |
| Comp. Ex. 3 | 250 | 15.5 | 2.5 | 75 |

EXPLANATION OF SYMBOLS

9 Collector terminal
10 Electrode for an electric double layer capacitor
11 Collector
12 Polarizing electrode layer
12a Pore
13 Conductive interlayer
15 Separator
20 Case
21 Top covering
22 Electrolyte solution
23 Collector lead

What is claimed is:

1. A conductive adhesive for connection between a sheet-like collector and a polarizing electrode layer serving as a structural member of an electrode for an electric double layer capacitor, wherein the conductive adhesive comprises a conductive material and a poly-N-vinylacetamide-based binder.

2. A conductive adhesive according to claim 1, wherein the weight-average molecular weight of the poly-N-vinylacetamide is 100,000 or greater.

3. A conductive adhesive according to claim 1, wherein the conductive material contains carbon black and/or graphite powder.

4. A conductive adhesive according to claim 3, wherein the carbon black is acetylene black.

5. A conductive adhesive according to claim 3, wherein the mean particle size of the graphite powder is no greater than 10 μm.

6. A conductive adhesive according to claim 3, wherein the graphite powder is a highly pure artificial graphite powder.

7. An electrode for an electric double layer capacitor having a polarizing electrode layer connected to at least one side of a sheet-like collector through a conductive adhesive, wherein the conductive adhesive is a conductive adhesive according to claim 1.

8. An electrode for an electric double layer capacitor according to claim 7, wherein the sheet-like collector contains plain aluminum foil.

9. An electrode for an electric double layer capacitor according to claim 7, wherein the polarizing electrode layer contains polytetrafluoroethylene (PTFE) as a binder.

10. A method for producing an electric double layer capacitor, wherein an electrode for an electric double layer capacitor according to claim 7 is subjected to drying treatment at a temperature of 200° C. or higher.

11. An electric double layer capacitor that comprises an electrode for an electric double layer capacitor according to claim 7.

* * * * *